United States Patent [19]

Shimizu et al.

[11] Patent Number: 5,422,520
[45] Date of Patent: Jun. 6, 1995

[54] SWITCHING CONTROL DEVICE

[75] Inventors: Toshimitsu Shimizu, Tokyo; Akira Sakai, Kanagawa, both of Japan

[73] Assignee: NEC Corporation, Tokyo, Japan

[21] Appl. No.: 4,456

[22] Filed: Jan. 14, 1993

[30] Foreign Application Priority Data

Jan. 14, 1992 [JP] Japan .................. 4-004812

[51] Int. Cl.6 ............................. H02B 1/24
[52] U.S. Cl. .................... 307/116; 307/112
[58] Field of Search ............... 307/112, 116, 140, 141; 361/58, 111, 908; 323/908; 364/480

[56] References Cited

U.S. PATENT DOCUMENTS 5,077,675 12/1991 Tam ..................... 364/480
5,272,584 12/1993 Austruy et al. ............. 361/58

Primary Examiner—Jeffrey A. Gaffin
Assistant Examiner—Peter Ganjoo
Attorney, Agent, or Firm—Ostrolenk, Faber, Gerb & Soffen

[57] ABSTRACT

A device for automatically controlling the switchover of a regular and a standby control board. A connection detecting circuit is built in each of the regular and standby control boards for determining whether or not the other control board is connected. A switching control circuit is also built in each of the two control boards for controlling the operation of the switching circuit in response to the output of the associated connection detecting circuit.

20 Claims, 3 Drawing Sheets

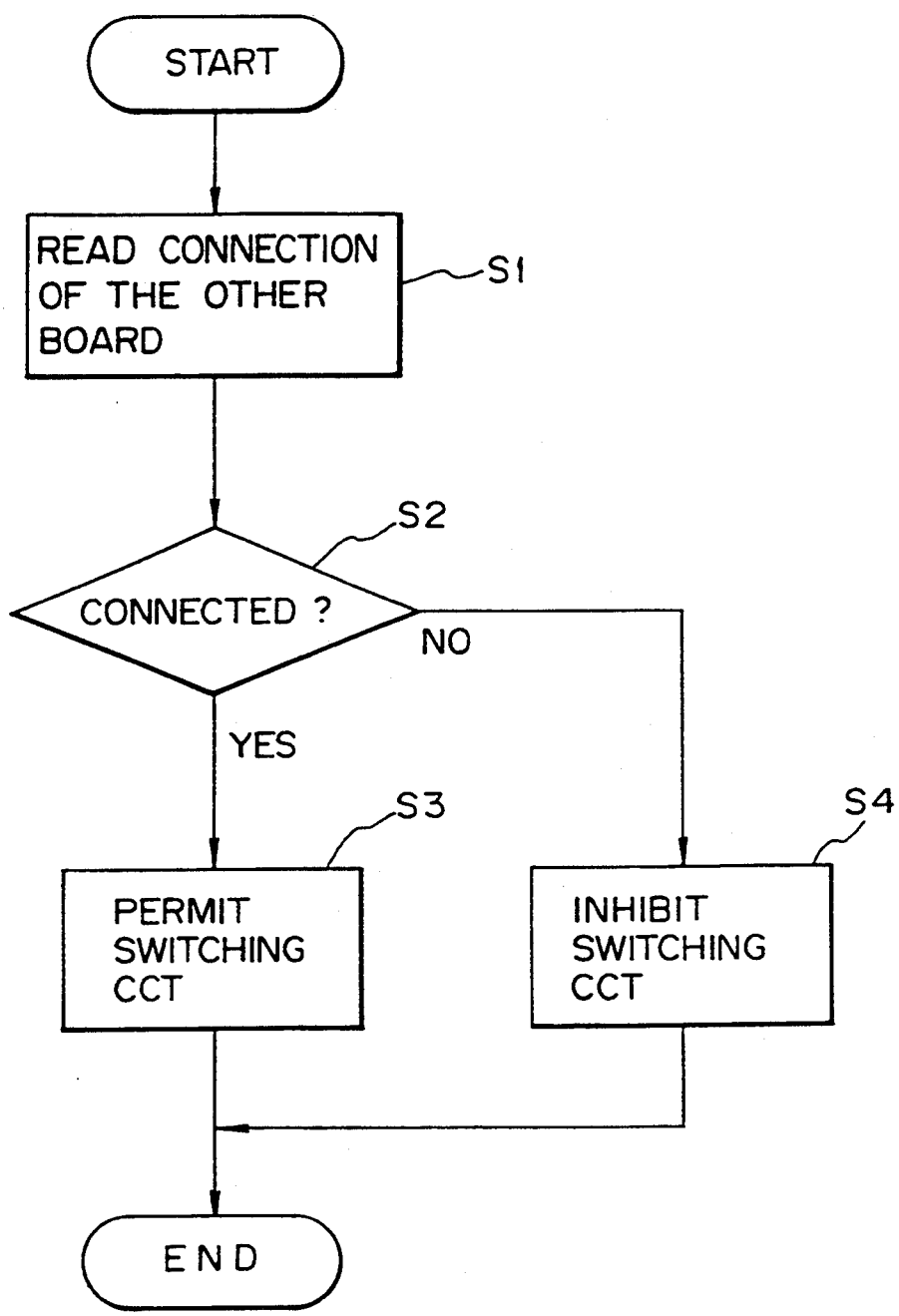

SWITCHING CONTROL DEVICE

BACKGROUND OF THE INVENTION

The present invention relates to a device for controlling the switchover of a regular and a standby control board automatically and stably without malfunctions.

It is a common practice with the above-described type of switching control device to removably connect a regular and a standby control board to each other and provide each of them with an MPU (Micro Processing Unit) function. Automatic switching circuits are included in the switching control device for automatically substituting the standby control board for the regular control board, as needed. The switching circuits are implemented by two flip-flops each being included in a respective one of the two control boards and constituted by a buffer and a NAND gate, and LEDs (Light Emitting Diodes) or similar indicators for displaying the status of each of the associated control boards. Assume that an error has occurred in the regular control board in operation. Then, an alarm signal being applied to the NAND gate of the regular control board as a switch command signal goes low to activate the switching circuit. As a result, the regular control board is killed with the LED thereof turned off. At the same time, an alarm signal being fed to the NAND gate of the standby control board goes high to start up the standby control board while turning on the associated LED. In this manner, the two control boards are automatically switched over by the switch command signals, i.e., switch control signals fed from the outside.

However, the problem with the conventional switching control device is that when the standby control board, for example, is pulled out from or reconnected to the regular control board for an inspection or maintenance purpose while the latter is in operation, noise is introduced in the switching circuit of the regular control board. Then, the switching circuit of the regular control board and, therefore, the control device itself often malfunctions. This makes it difficult to inspect or maintain the control device.

SUMMARY OF THE INVENTION

It is, therefore, an object of the present invention to provide a switching control device capable of switching over a regular and a standby control board automatically and stably without malfunctions.

A device for controlling the automatic switchover of a regular and a standby control board which are removably connected to each other of the present invention comprises an automatic switching circuit for automatically switching the regular and standby control boards, a connection detecting circuit provided in each of the regular and standby control boards for determining whether or not the other control board is connected, and a switching control circuit for controlling the switching operation of the automatic switching circuit in response to a result of detection from one of the one of the connection detecting circuits.

BRIEF DESCRIPTION OF THE DRAWINGS

The above and other objects, features and advantages of the present invention will become more apparent from the following detailed description taken with the accompanying drawings in which:

FIG. 3 is a timing chart demonstrating a specific switching operation of the embodiment.

DESCRIPTION OF THE PREFERRED EMBODIMENT

Figure 1:
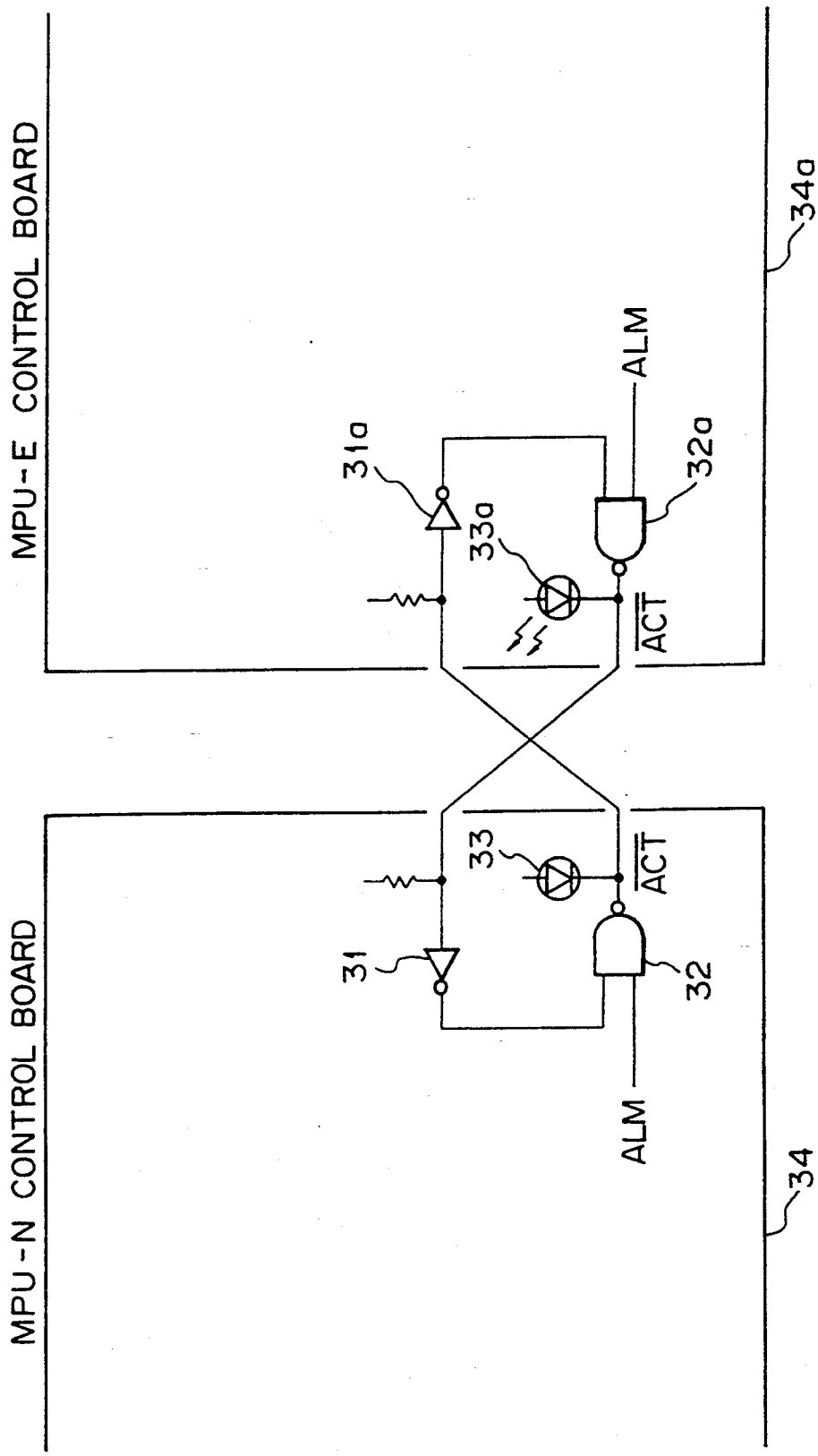
FIG. 1 is a circuit diagram showing the basic construction of a conventional switching control device.

To better understand the present invention, a brief reference will be made to a conventional switching control device having a basic construction. As shown, the control device has control boards 34 and 34a each having an MPU function and being removably connected to each other. An automatic switching circuit, no numeral, is built into each of the control boards 34 and 34a for automatically substituting one of the control boards 34 and 34a for the other of the control board, as needed. The switching circuits are implemented as flip-flops consisting of, respectively, buffers 31 and 31a and NAND gates 32 and 32a. Labeled 33 and 33a in the figure are LEDs or similar indicators for displaying the status of each of the control boards 34 and 34a, respectively. Assume that the M-PUN control board 34 is a regular control board, and that an error has occurred in the control board 34. Then, an alarm signal ALM being applied to the NAND gate 32 from the outside as a switch command or switch control signal goes low to cause the switching circuit to start operating. In response, the regular control board 34 is killed with the LED 33 thereof turned off. At the same time, an alarm signal ALM being applied to the NAND gate 32a of the standby control board 34a goes high to start up the control board 34a. In response, the LED 33a of the standby control board 34a is turned on.

However, the problem with the conventional switching control device is that when the standby control board 34a, for example, is pulled out from or reconnected to the regular control board 34 for an inspection or maintenance purpose while the latter is in operation, noise is introduced in t h e switching circuit of the regular control board 34a, as stated earlier. Then, the switching circuit of the regular control board often malfunctions, making it difficult to inspect or maintain the control device.

Figure 2:
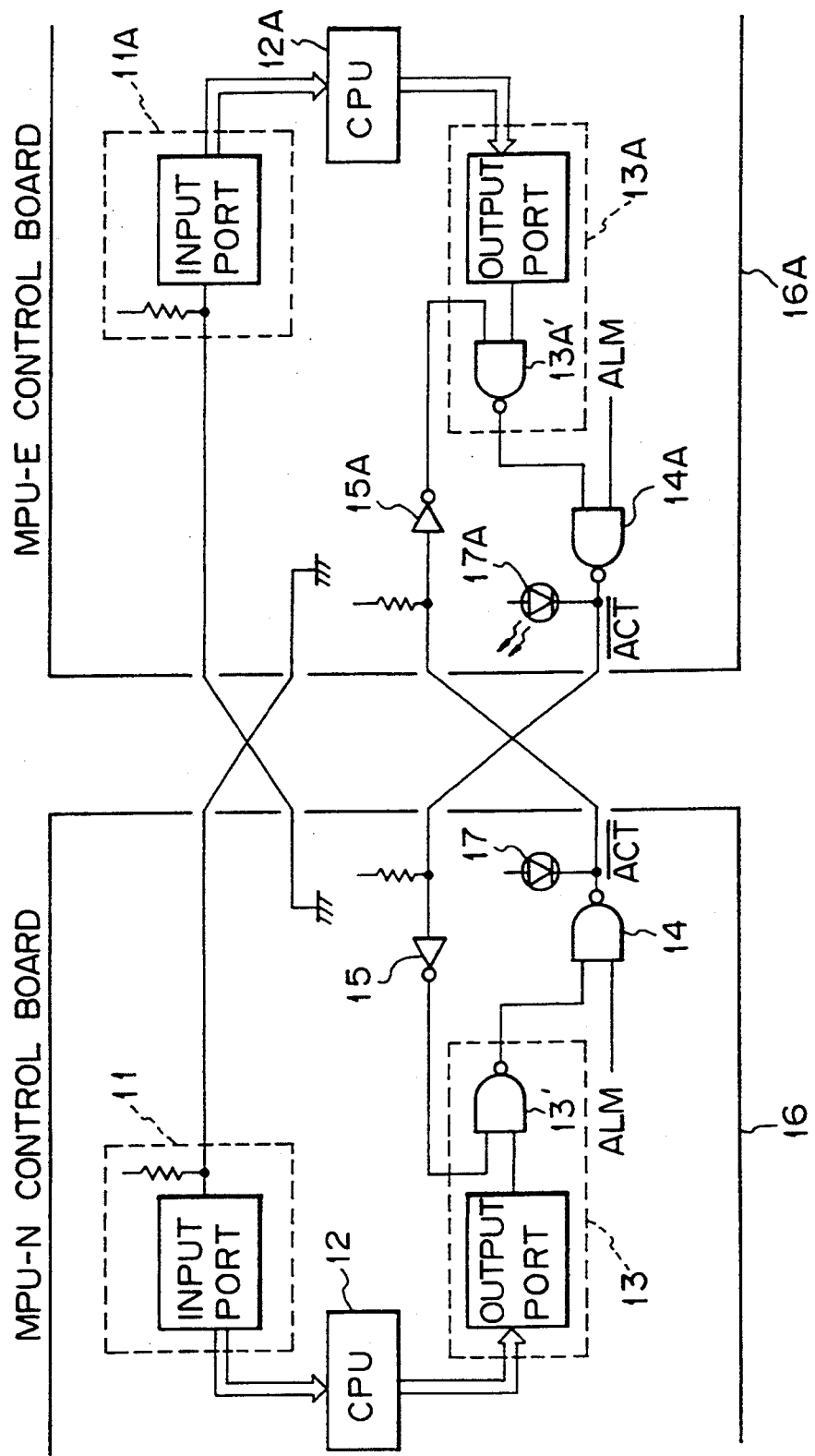
FIG. 2 is a circuit diagram showing a switching control device embodying the present invention.

Referring to FIG. 2, a switching control device embodying the present invention is shown. As shown, the control device has a pair of control boards 16 and 16A removable from each other, and automatic switching circuits for substituting one of the control boards 16 and 16A for the other of the control boards. The switching circuits are constituted by flip-flops made up of, respectively, buffers 15 and 15A and NAND gates 14 and 14A. A NAND gate 13' is connected between the buffer 15 and the NAND gate 14 and forms part of an output port 13 which will be described. Likewise, a NAND gate 13A' is connected between the buffer 15A and the NAND gate 14A to form part of an output port 13A which will also be described.

Input ports 11 and 11A are respectively provided in the control boards 16 and 16A, and each serves as a means for determining whether or not the other control board 16 or 16A is connected. The output port 13 and a CPU (Central Processing Unit) 12 are built in the control board 16 and constitute means for controlling, i.e., permitting or inhibiting the operation of the automatic switching circuits in response to the output of the input port 11. Also, the output port 13A and a CPU 12A are built in the control board 16A and function in the same manner as the output port 13A and CPU 12. Specifically, the input ports 11 and 11A are connected to the control boards 16A and 16, respectively. Each of the CPUs 12 and 12A controls the switching operation of the respective switching circuit via the output port 13 or 13A thereof by determining whether or not the other control board 16A or 16 is connected via the input port 11 or 11A. With this construction, the control device inhibits the switching circuit from operating if either of the control boards 16 and 16A is not connected as determined by the above-stated means or permits it to operate if otherwise.

There are also shown in FIG. 2 LEDs or similar indicators 17 and 17A for indicating the status of each of the control boards 16 and 16A, respectively, and alarm signals ALM.

A reference will also be made to FIG. 3 for describing the switching operation of the switching device. Assume that the MPU-N control board 16 and the MPU-E control board 16A are respectively regular and standby, and that the control board 16A is removed from or reconnected to the control board 16 while the latter is in operation.

The input port 11 of the regular control board 11 constantly monitors the status to determine whether or not the standby control board 16A is connected. The CPU 12 of the regular control board 11 reads such a status via the input port 11 (step S1), and then determines whether or not the standby control board 16A is connected (S2). If the control board 16A is connected to the control board 16, the CPU 12 permits the switching circuit to operate (S3); if otherwise, the former inhibits the latter from operating (S4). Then, the CPU 12 ends the processing.

Assume that the standby control board 16A is pulled out from the regular control board 16 while the latter is in operation. Then, the CPU of the regular control board 16 detects the removal of the standby control board 16A via the input port 11 and inhibits the switching circuit from operating via the output port 13. The MPU-N control board 16 is constantly regular and, so long as the switching circuit is inhibited from operating via the output port 13, prevents the switching circuit from being affected by a signal from the buffer 15. As a result, the switching circuit does not function although noise may be introduced in the input to the buffer 15 when the standby control board 16A is connected to the regular control board 16.

Once the standby control board 16A is connected to the regular control board 16, the switching circuit can substitute the former for the latter upon the occurrence of an error in the conventional way. Specifically, as the CPU 12 of the regular control board 16 detects the standby control board 16A via the input port 11, it permits the switching circuit to operate via the output port 13. When an error occurs in the regular control board 16, the alarm signal ALM being fed via the NAND gate 14 goes low to activate the switching circuit. As a result, the LED 17 is turned off, and the regular control board 16 stops operating. At the same time, the alarm signal ALM being applied to the NAND gate 14A of the standby control board 16A goes high to start up the control board 16A. Then, the LED 17A of the control board 16A is turned on.

In summary, it will be seen that the present invention provides a switching control device which prevents an automatic switching circuit incorporated in a regular control board from malfunctioning due to noise which may be introduced in the circuit when a standby control board is pulled out or reconnected to the regular control board for inspection or maintenance. As a result, the automatic switching operation is stable and facilitates inspection and maintenance. These advantages are derived from the connection detecting means built in each of the regular and standby control boards for determining whether or not the other control board is connected, and switching control means also built in each of the two control boards for controlling the operation of the switching circuit in response to the output of the associated connection detecting means.

Various modifications will become possible for those skilled in the art after receiving the teachings of the present disclosure without departing from the scope thereof. For example, while the embodiment assigns a regular and a standby function to the control boards 16 and 16A, respectively, the two functions may, of course, be replaced with each other since the control boards 16 and 16A are symmetrical in construction in the right-and-left direction. If desired, the CPUs 12 and 12A capable of controlling the respective switching circuits via the output ports 13 and 13A may be omitted and entirely implemented by hardware.

What is claimed is:

1. A device for controlling automatic switchover of operation of one of a regular control board and a standby control board to the other of the regular control board and the standby control board, the regular board and the standby control board being removably connected to each other, the device comprising:

automatic switching means for automatically switching operation of one of the regular and standby control boards to the other of the regular and standby control boards;

connection detecting means provided in each of the regular and standby control boards for determining whether the regular control board and the standby control board are connected to each other and for outputting an output signal; and switching control means provided in each of the regular and standby control boards for controlling a switching operation of said automatic switching means in response to said output signal from one of said connection detecting means.

2. A device as claimed in claim 1, wherein each of said switching control means inhibits said automatic switching means from operating when said output signal indicates that the regular control board and the standby control board are not connected to each other and permits said automatic switching means to operate when said output signal indicates that the regular control board and the standby control board are connected to each other.

3. A device as claimed in claim 2, wherein each of said switching control means comprises a CPU and an output port.

4. A device as claimed in claim 1, wherein each of said connection detecting means comprises an input port.

5. The device of claim 1, wherein when one of said automatic switching means switches the operation from one of the regular control board and the standby control board to the other of the regular control board and the standby control board, operation of the other of the regular control board and the standby control board is substituted for operation of the one of the regular control board and the standby control board.

6. The device of claim 1, wherein each of the regular control board and the standby control board further comprises means for detecting an erroneous operation of the respective control board and means for activating said automatic switching means in response to a detection of an erroneous operation.

7. An apparatus for controlling a switching of operation of one of a first control board and a second control board to the other of the first control board and the second control board, the apparatus comprising:
  a first switch for switching operation from said first control board to said second control board;
  a second switch for switching operation from said second control board to said first control board;
  a first detector contained within said first control board for detecting whether said second control board is connected to said first control board;
  a second detector contained within said second control board for detecting whether said first control board is connected to said second control board;
  a first controller for controlling said first switch based on an output from said first detector; and
  a second controller for controlling said second switch based on an output from said second detector.

8. The apparatus of claim 7, wherein said first controller prevents said first switch from switching operation when said first detector detects that said second control board is not connected to said first control board and said second controller prevents said second switch from switching operation when said second detector detects that said first control board is not connected to said second control board.

9. The apparatus of claim 7, wherein said first controller allows said first switch to switch operation when said first detector detects that said second control board is connected to said first control board and said second controller allows said second switch to switch operation when said second detector detects that said first control board is connected to said second control board.

10. The apparatus of claim 7, wherein said first control board is a regular control board and said second control board is a standby control board.

11. The apparatus of claim 7, wherein each of said first and second controllers comprise a CPU and an output port.

12. The apparatus of claim 7, wherein each of said first and second detectors comprise an input port.

13. The device of claim 7, wherein when one of said first switch and said second switch switches operation from one of said first control board and said second control board to the other of said first control board and said second control board, operation of the other of the said first control board and said second control board is substituted for operation of the one of the first control board and the second control board.

14. The device of claim 7, wherein the first control board further comprises a detector for detecting an erroneous operation of the first control board and a first activator for activating said first switch in response to said first detector detecting an erroneous operation and said second control board further comprising a second detector for detecting an erroneous operation of the second control board and a second activator for activating said second switch in response to said second detector detecting an erroneous operation.

15. An electronic device comprising:
  an active control board;
  a standby control board, the active control board and the standby control board being connected to each other;
  a switching member for switching operation of one of the active control board and the standby control board to the other of the active control board and the standby control board;
  a connection detector for detecting whether the active control board and the standby control board are connected to each other; and
  a controller for preventing the switching member from performing a switching operation when the connection detector detects that the active control board and the standby control board are not connected to each other.

16. The device of claim 15, wherein the switching member comprises at least two flip-flops provided in each of the active control board and the standby control board.

17. The device of claim 15, further comprising an error detector for detecting an erroneous operation of the active control board and the standby control board and for outputting a signal to the switching member to switch operation of the active control board and the standby control board upon detection of an erroneous operation.

18. The device of claim 15, wherein the controller comprises a CPU and an output port provided in each of the active control board and the standby control board.

19. The device of claim 15, wherein the connection detector comprises an input port provided in each of the active control board and the standby control board.

20. The device of claim 15, wherein the controller allows the switching member to switch operation when the connection detector detects that the active control board and the standby control board are connected.

* * * * *